United States Patent [19]

Hayashi et al.

[11] Patent Number: 5,822,676
[45] Date of Patent: Oct. 13, 1998

[54] DIGITAL SERIALIZATION OF PROGRAM EVENTS

[75] Inventors: Michael T. Hayashi, Aurora; Michael B. Adams, Castle Rock, both of Colo.

[73] Assignee: Time Warner Entertainment Co. L.P., Stamford, Conn.

[21] Appl. No.: 572,517

[22] Filed: Dec. 14, 1995

[51] Int. Cl.$^6$ .................................................. H04N 7/173
[52] U.S. Cl. ........................... 455/4.2; 455/6.2; 455/6.3; 348/12; 348/10; 386/94
[58] Field of Search .................... 395/200.47, 200.48, 395/200.49; 348/10, 11, 12, 13, 6, 7, 8, 5.5; 455/4.2, 5.1, 6.1, 6.2, 6.3; 380/3, 5, 7, 10, 15; 386/95, 94; 360/60; H04N 7/16, 7/167, 7/173

[56] References Cited

U.S. PATENT DOCUMENTS

| | | |
|---|---|---|
| 3,956,717 | 5/1976 | Fisher et al. . |
| 4,214,316 | 7/1980 | Lipsky . |
| 4,506,387 | 3/1985 | Walter . |
| 4,530,008 | 7/1985 | McVoy . |
| 4,553,161 | 11/1985 | Citta . |
| 4,592,546 | 6/1986 | Fascenda et al. . |
| 4,595,950 | 6/1986 | Lofberg ..................................... 360/60 |
| 4,823,386 | 4/1989 | Dumbauld et al. . |
| 4,890,319 | 12/1989 | Seth-Smith et al. ......................... 380/5 |
| 4,991,208 | 2/1991 | Walker et al. . |
| 5,046,090 | 9/1991 | Walker et al. . |
| 5,093,718 | 3/1992 | Hoarty et al. . |
| 5,168,353 | 12/1992 | Walker et al. . |
| 5,220,420 | 6/1993 | Hoarty et al. . |
| 5,255,267 | 10/1993 | Hansen et al. . |
| 5,311,423 | 5/1994 | Clark . |
| 5,343,239 | 8/1994 | Lappington et al. . |

(List continued on next page.)

OTHER PUBLICATIONS

Adams, Michael, "Network Design and Implementation of a large–scale, ATM, Multimedia Network," *Engineer Conference Notes* from NETWORLDsm+INTEROP® 95, Las Vegas, NV (Mar. 27–31, 1995).

Adams, Michael, "Real Time MPEG Asset Delivery over ATM," *NCTA Technical Papers, 1995*:315–326 (1995).

News Release, "Time Warner Introduces World's First Full Service Network in Orlando," Timewarner Cable Full Service Network, Maitland, FL, 32751 (Dec. 14, 1994).

Product Information Package from Wink Communications, 2061 Challenger Drive, Alameda, CA 94501 (1995).

Request for Proposals, "Development of a Full Service Network: A request by Time Warner for assistance in building a full service telecommunications network" (Feb. 11, 1993), Time Warner Cable, Denver, CO.

Vecchi, Mairo P., and Adams, Michael, "Traffic Management for Highly Interactive Transactional System," *NCTA Technical Papers, 1995*:258–266 (1995).

*Primary Examiner*—Chris Grant
*Attorney, Agent, or Firm*—Homer L. Knearl; Holland & Hart llp

[57] ABSTRACT

A method and apparatus for encoding a serial number into a program event. The encoder embeds the serial number into the program event so that it is imperceptible to the user when the program event is played to the user. The embedded serial number is unique to the user so that any storage medium storing the program event can be traced back to the user. This encoding technique is especially useful in interactive systems where a server at the head end receives subscriber identification numbers along with subscriber requests for program events. Thus, in response to a subscriber request for a program event, the server can generate a serial number unique to the user. The serial number can include a time and date stamp, and a cyclic redundancy check code. In an interactive system, the encoder may be located in a set-top terminal, which receives the serial number from the server in the head end. The encoder can embed each bit of the serial number into at least one field of the program event, where the program event comprises multiple video images, and each image consists of two interlaced television fields. The encoder can differentially encode each serial number bit into alternating fields of the program event by adjusting the luminance level of the fields.

15 Claims, 7 Drawing Sheets

U.S. PATENT DOCUMENTS

| | | |
|---|---|---|
| 5,357,276 | 10/1994 | Banker et al. . |
| 5,361,091 | 11/1994 | Hoarty et al. . |
| 5,383,112 | 1/1995 | Clark . |
| 5,390,337 | 2/1995 | Jelinek et al. . |
| 5,394,394 | 2/1995 | Crowther et al. . |
| 5,400,402 | 3/1995 | Garfinkle . |
| 5,412,720 | 5/1995 | Hoarty . |
| 5,421,031 | 5/1995 | De Bey . |
| 5,422,674 | 6/1995 | Hooper et al. . |
| 5,423,555 | 6/1995 | Kidrin . |
| 5,425,027 | 6/1995 | Baran . |
| 5,426,699 | 6/1995 | Wunderlich et al. . |
| 5,442,700 | 8/1995 | Snell et al. . |
| 5,446,726 | 8/1995 | Rostoker et al. . |
| 5,452,297 | 9/1995 | Hiller et al. . |
| 5,453,979 | 9/1995 | Schibler et al. . |
| 5,455,701 | 10/1995 | Eng et al. . |
| 5,455,820 | 10/1995 | Yamada . |
| 5,455,825 | 10/1995 | Lauer et al. . |
| 5,459,722 | 10/1995 | Sherif . |
| 5,519,433 | 5/1996 | Lappington et al. ............... 348/10 |

DIGITAL SERIALIZATION OF PROGRAM EVENTS

BACKGROUND

With the advent of high-speed, high-bandwidth networking (e.g., transfer rates approaching one gigabit per second), "full-service" interactive television networks deliver a broad range of digital and analog services to large numbers of user/customers. Some of these services include, for example, video-on-demand, home shopping, video games, and video conferencing, as well as the usual host of analog television programming.

These full-service networks typically include a central source location (called a "head end") that provides a stream of data and programming to subscribers. The head end itself usually comprises a bank of powerful servers connected to fast memory storage. The memory storage contains the data and applications requested by individual subscribers. As requests for data or programming are made, the head end services these requests by transporting the needed data and programming. The data and programming streams that enter into the subscriber's home are then processed by a "set-top processor" (also known as a set-top converter, home communications terminal (HCT), or the like).

In a video-on-demand system, a subscriber who wants to view a particular program event, such as a movie or television show, asserts a request that is transmitted to the head end. In response, a server at the head end retrieves the requested program event and transmits it at high speed to the subscriber through the network. In conventional systems, there are few means for preventing the subscriber from copying the requested program event and distributing the copies to many recipients. Such video piracy is especially acute for popular pay-per-view sporting events, which are relatively expensive to the cable operator and at the same time result in a great loss of potential revenue because of widespread distribution to unauthorized viewers.

Some conventional video-on-demand systems attach to data packets that are transmitted downstream a receiver I.D. unique to each subscriber. As shown in U.S. Pat. No. 5,421,031, issued to DeBey, when a subscriber requests a program event, the head end computer records the I.D. and appends it to each data packet containing the program information requested by the subscriber. Only a set-top having the same unique receiver I.D. is able to receive the program packets. Although this security system prevents unauthorized reception of the program, it does not prevent an authorized subscriber from copying and distributing the event after it has been received.

U.S. Pat. No. 5,046,090, issued to Walker et al., describes one system for discouraging copying. The video program is transmitted to the subscriber in scrambled form. The system embeds a random code into television fields of the program. Using this code in conjunction with the encryption key, the subscriber terminal transforms the unintelligible video signal into one suitable for viewing by the subscriber. If the subscriber records the program event, he captures the embedded information along with the program video. Upon playback, the program event will be scrambled unless playback is performed in conjunction with the encryption key. In this manner, video piracy is discouraged. Again, however, this method does not prevent an authorized subscriber from copying the event after it has been decoded and displayed.

Although conventional methods may be effective to accomplish their desired objectives, they are relatively complex and expensive, and can be defeated with relative ease. It is therefore desirable to find a simpler, more cost-effective means for combating video piracy.

SUMMARY OF THE INVENTION

The present invention overcomes the disadvantages of the prior art by providing a method and apparatus for encoding a serial number into a program event. The encoder embeds the serial number into the program event so that it is imperceptible to the user when the program event is played to the user. The embedded serial number is unique to the user so that any storage medium storing the program event can be traced back to the user. This encoding technique is especially useful in interactive systems where a server at the head end receives subscriber identification numbers along with subscriber requests for program events. Thus, in response to a subscriber request for a program event, the server can generate a serial number unique to the user. The serial number can include a time and date stamp, and a cyclic redundancy check code.

In an interactive system, the encoder may be located in a set-top terminal, which receives the serial number from the server in the head end. The encoder can embed each bit of the serial number into at least one field of the program event, where the program event comprises multiple video images, and each image consists of two interlaced television fields. The encoder can differentially encode each serial number bit into alternating fields of the program event by adjusting the luminance level of the fields.

BRIEF DESCRIPTION OF THE DRAWINGS

The drawings set forth exemplary embodiments of the invention as follows.

DETAILED DESCRIPTION OF THE INVENTION

The present invention provides a method and apparatus for digital serialization of program events, such as individually-ordered movies over an interactive network. In the following description, numerous details are set forth for purposes of explanation. However, one of ordinary skill in the art will realize that the invention may be practiced without the use of these specific details. In other instances, well-known structures, process steps and the like are omitted in order not to obscure the description of the invention with unnecessary detail.

Figure 1:
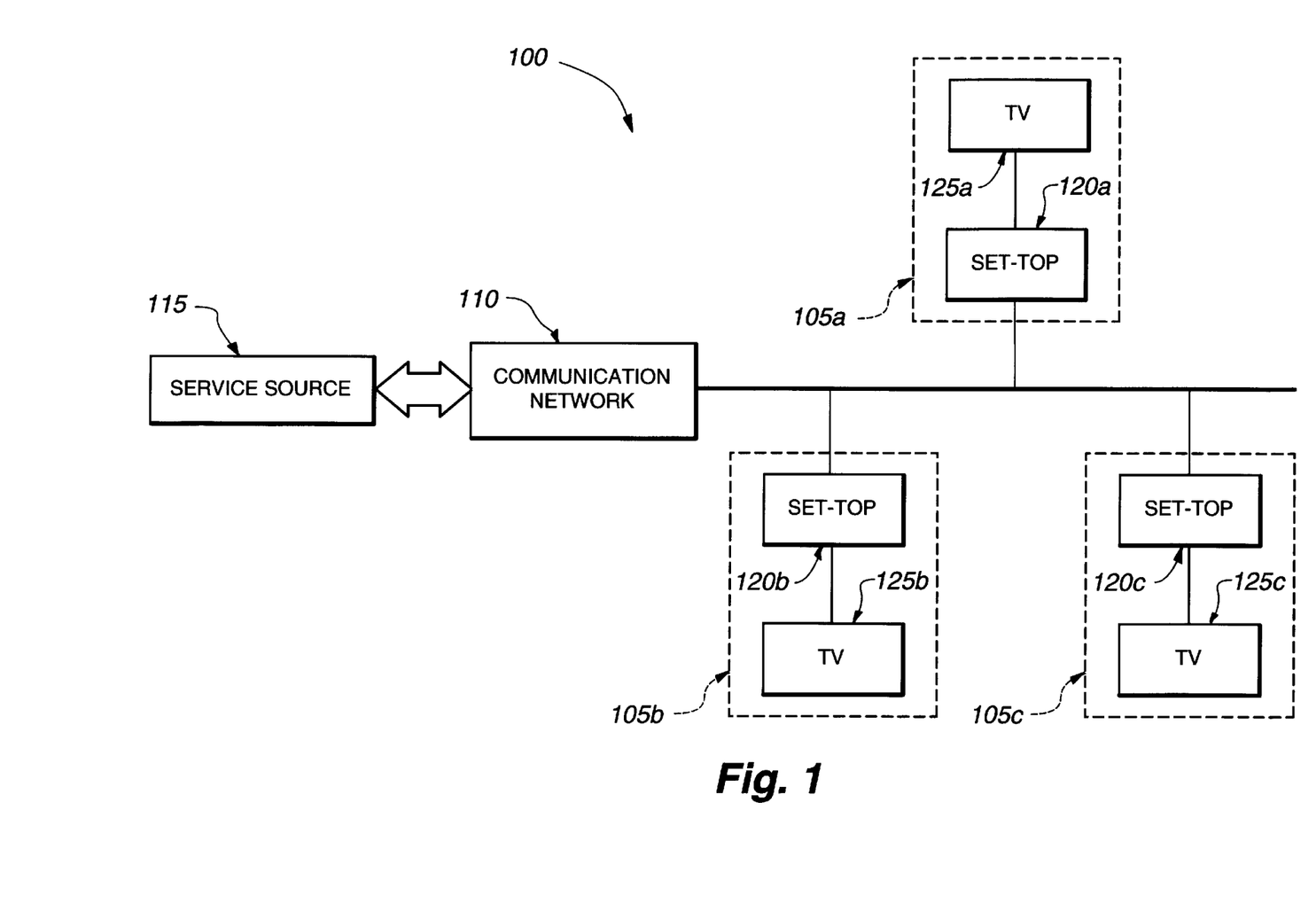
FIG. 1 illustrates an interactive communication system into which the invention may be incorporated.

FIG. 1 presents an interactive communication system 100 into which the invention may be incorporated. An example of such a network is the Time Warner Full Service Network operating in Orlando, Fla. This system includes a number of home terminal nodes 105, a communication network 110, and a service source 115. As shown in FIG. 1, each home terminal node 105 includes a set-top 120 and a television 125. Each set-top controls the operation of its corresponding television. In addition, through the communication network 110, a set-top (1) establishes a communication link between the television viewer and the service source, (2) presents selectable programming options provided by the service source to the viewer, and (3) relays program selections and commands from the viewer to the service source.

Figure 2:
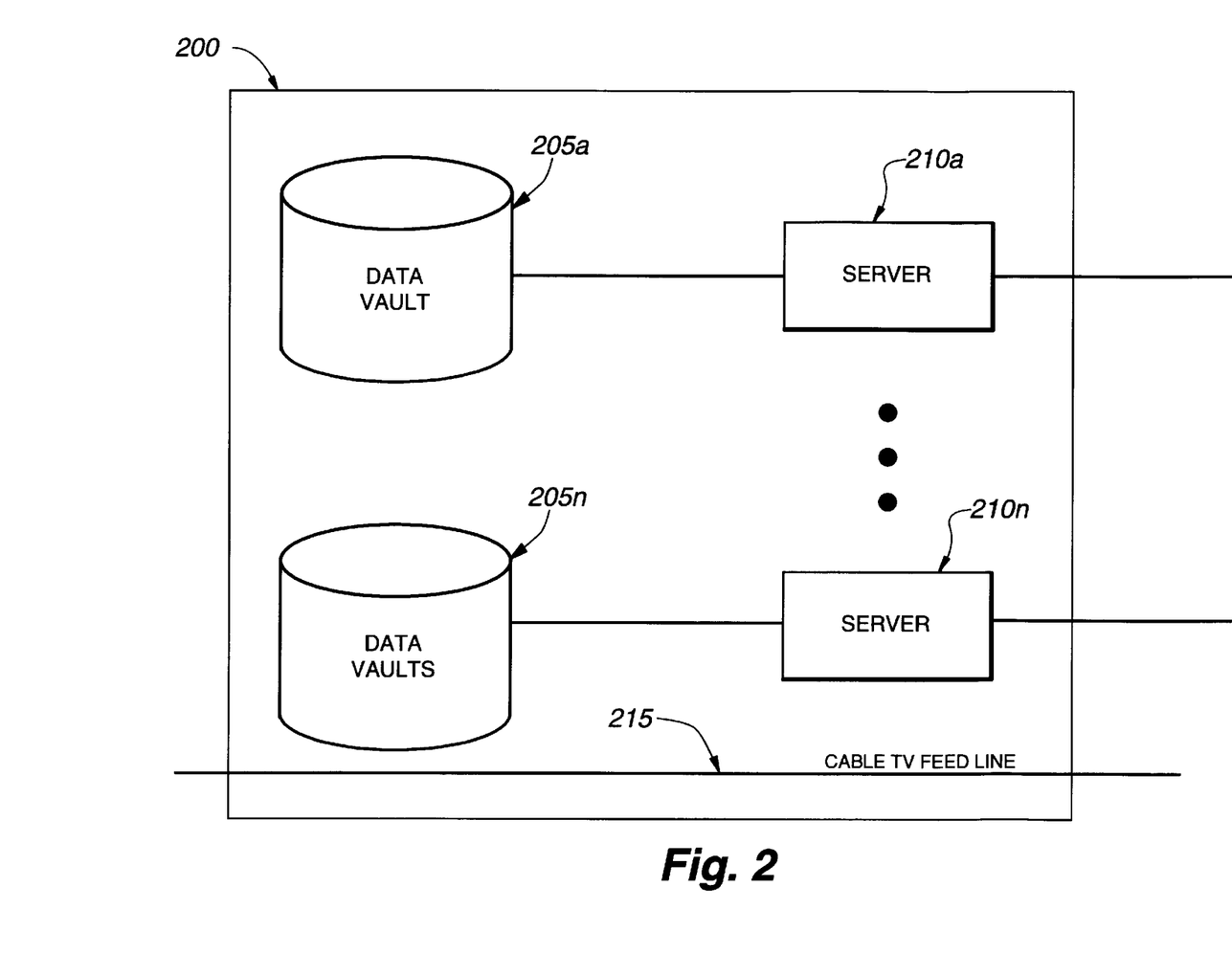
FIG. 2 is an example of a service source used in the interactive communication system of FIG. 1.

FIG. 2 presents an example of a service source used in the interactive communication system of FIG. 1. As shown in FIG. 2, one example of the service source 115 includes a number of data storage vaults 205, a number of media servers 210, and a cable TV feedline 215. The service source 200 utilizes data storage vaults 205 and media servers 210 to provide a variety of interactive digital services to the subscribers of the system. Specifically, the data storage vaults 205 are used to store the digital programming content and application programs, and the media servers 210 are used to retrieve the stored digital media and implement other commands in response to requests from the home terminal nodes.

The retrieved digital program (or application to be downloaded) can be transmitted to the set-top through a shared channel or a dedicated channel. A shared channel is used to transmit data to a number of subscribers, while a dedicated channel is used to transmit data to a specific user of network 110. As further shown in FIG. 2, service source 200 also has a cable feedline 215, which receives analog cable programming from a local cable company and supplies this programming to the network. The network then broadcasts the cable programming to all of the system's subscribers on shared bandwidths.

Figure 3:
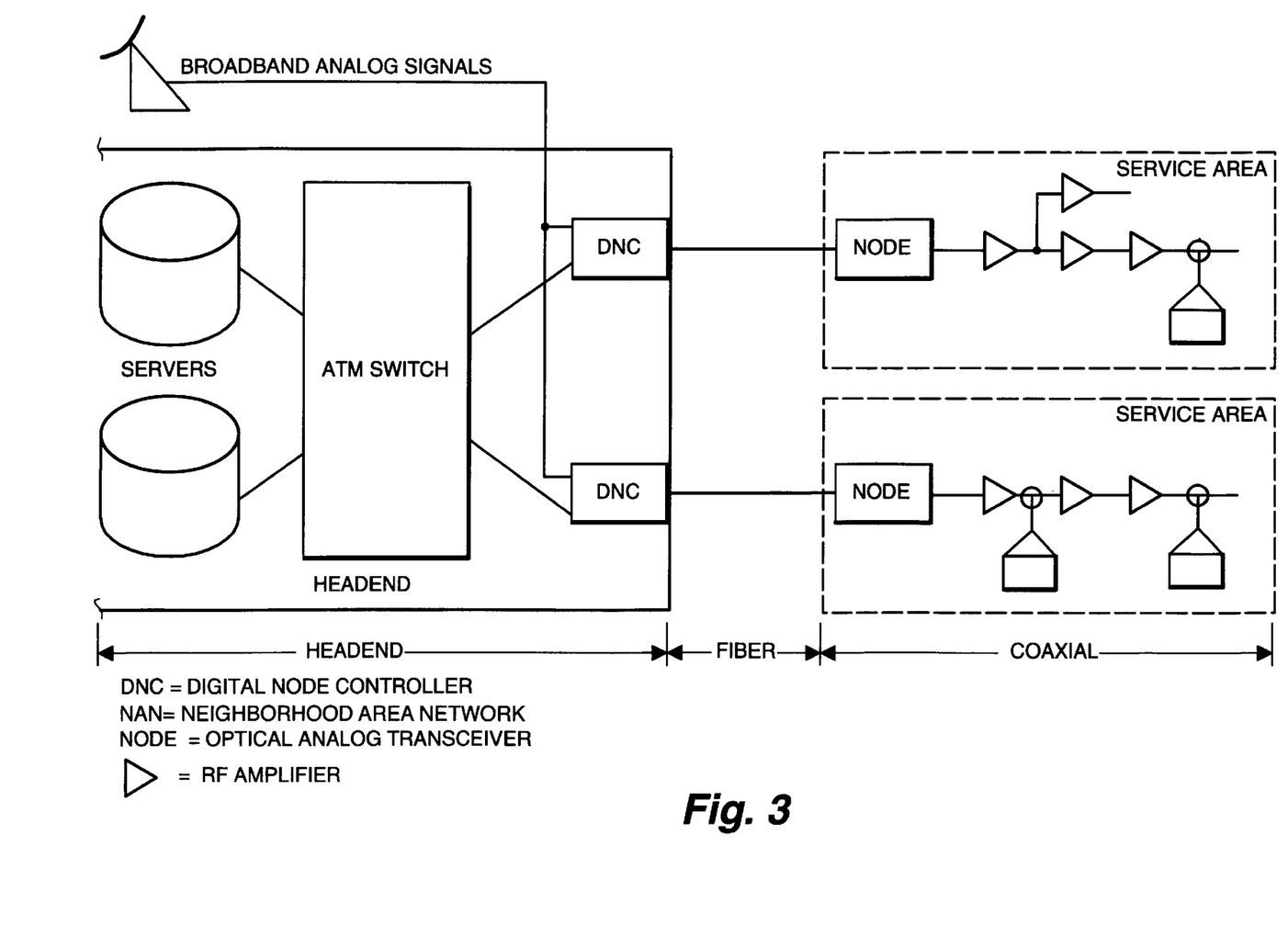
FIG. 3 presents another interactive entertainment system used by the invention.

FIG. 3 presents another interactive entertainment system used by the invention. A description of this interactive entertainment system is provided in the United States patent application entitled "A Method for Message Addressing in a Full Service Network," filed on Dec. 14, 1995, Ser. No. 08/572,521 and assigned to the assignee of the present application. That application is incorporated herein by reference.

Figure 4:
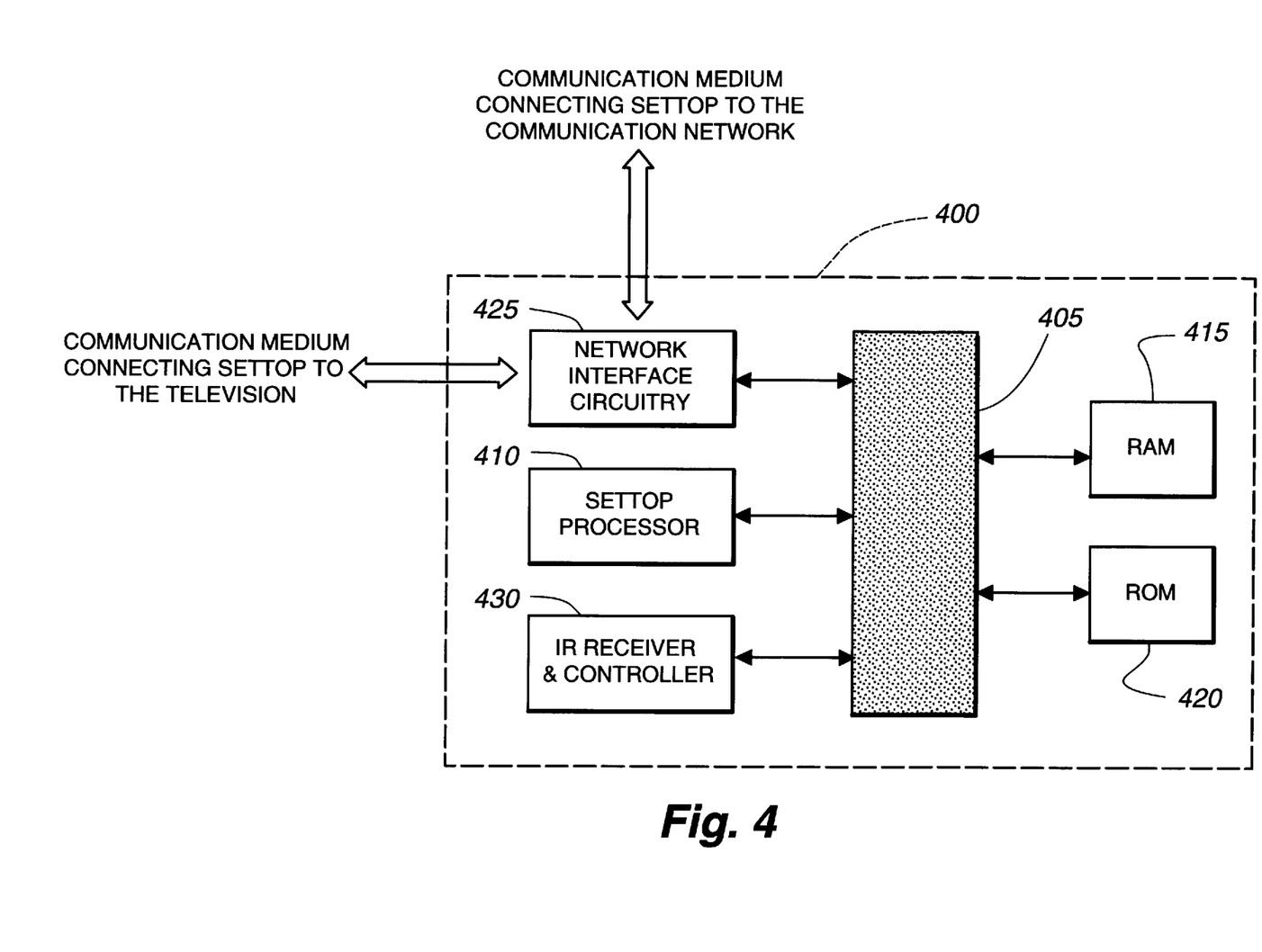
FIG. 4 illustrates a home terminal set-top used by the invention.

FIG. 4 presents a home terminal set-top 400 used by the invention. As mentioned above, the set-top device controls the operation of its corresponding television. In addition, the set-top (1) establishes a communication link between the television viewer and the service source, (2) presents selectable programming options provided by the service source to the viewer, and (3) relays program selections and commands from the viewer to the service source.

As shown in FIG. 4, the set-top 400 includes an internal bus 405, a processor 410, a random access memory (RAM) 415, a read-only memory (ROM) 420, a network interface 425, and an infra-red (IR) controller 430. Bus 405 represents the collective communication interface between the numerous internal modules of the set-top 400. In addition, this set-top uses processor 410 for processing digital signals, thereby controlling the operation of the set-top. Processor 410 is directed by the firmware and software instructions that respectively reside in ROM 420 and RAM 415. Moreover, the set-top 400 also uses RAM 415 to store temporary variables or other intermediate information during the operation of the processor.

As further shown in FIG. 4, the network interface 425 represents the interface circuitry utilized by set-top 400 for communicating to the network or the television through external communication media (such as coax cables). Finally, set-top 400 includes IR controller 430 for receiving and decoding communications from a remote control (not shown) operated by the viewer.

Figure 5:
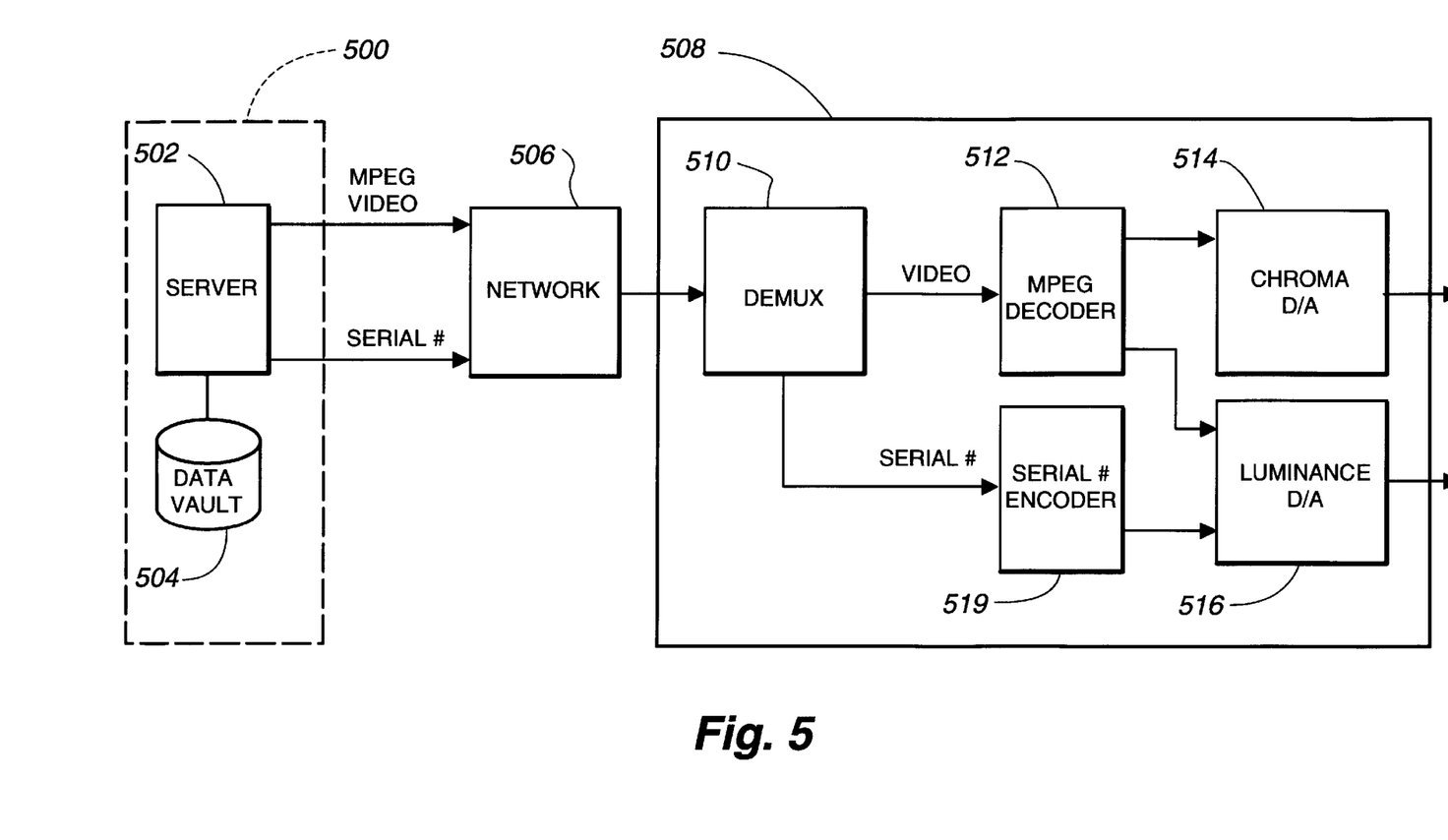
FIG. 5 illustrates an embodiment for implementing digital serialization according to the present invention.
Figure 6:
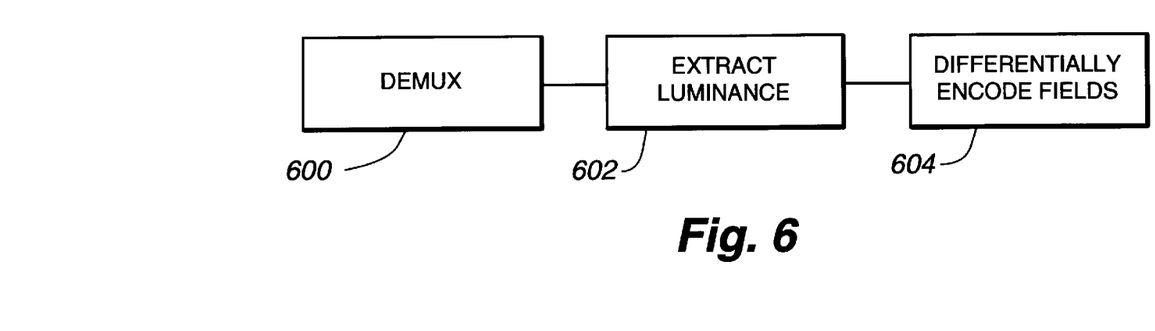
FIG. 6 is a flow chart diagramming serial number encoding according to the present invention.

FIGS. 5 and 6 illustrate the structure and operation of one embodiment of the present invention for implementing digital serialization. The service source 500 at the head end includes at least one server 502 coupled to a data vault 504. The data vault 504 stores the content of the program event. Preferably, the program event is stored in MPEG-2 format. MPEG-2 is a standard intraframe and interframe compression algorithm for motion video. The output of the head end is transferred through the network 506 to the set-top terminal 508.

The set-top 508 includes, among other well-known functional units that are not shown, a demultiplexer 510, an MPEG decoder 512, two digital-to-analog converters (D/A) 514 for the chrominance components of the image, a D/A 516 for the luminance component of the image, and a serial number encoder 518 according to the present invention. The D/As include filters for extracting the luminance and chrominance components, as is known in the art. Preferably, the demultiplexer 510, decoder 512, encoder 518 and D/As 514 and 516 are integrated onto a single chip to make tampering difficult.

The serial number encoder 518 operates as follows. As in conventional systems, to obtain a program event the subscriber set-top 508 issues a request, which includes the subscriber identification number and the program identification number. The subscriber identification number is typically used for billing purposes. The set-top 508 transmits the request upstream through the network 506 to the server 502. In response, the server 502 records the subscriber and program identification numbers into local memory, such as the data vault 504 or other memory. From these two parameters, the server 502 creates a unique serial number or signature according to the invention. The serial number can also include information such as the original source of the program event (cable system or distributor), and a date and time stamp. The server 502 also preferably includes in the serial number an error check sequence, such as CRC32 (cyclic redundancy check code), to verify the integrity of the serial number according to well-known techniques.

According to an embodiment of the invention, the server 502 transfers the MPEG stream and the serial number separately over the network to the set-top 508. The serial number may be transported over a private data section of the MPEG transport stream, which is part of the MPEG standard employed to add information required by the system designer, such as Internet Protocol data, among others. Using known techniques, the demultiplexer 510 in the set-top 508 demultiplexes this incoming data from the network 506 into the MPEG video stream and the private data stream containing the serial number (step 600). According to one embodiment, the MPEG decoder 512 decodes the MPEG-formatted video stream into standard NTSC video. As is well known in the art, the standard video signal may be broken down into chrominance and luminance analog components by the chrominance D/As 514 and the luminance D/A 516 (step 602).

The serial number encoder 518 encodes each bit of the serial number into the luminance component by adjusting the output level of the luminance D/A 516 on a field-by-field basis. The only requirement is that the serial number be encoded so that it is imperceptible to the viewer and relatively immune to noise. Preferably, each bit of the serial number is differentially encoded into the two video fields comprising a video frame (step 604). One way to accomplish differential encoding is to adjust the luminance levels of the two fields in opposite directions according to the bit being encoded. For example, the serial number encoder may increase the luminance level in the first field and decrease the luminance level in the corresponding second field to encode a zero bit, whereas the encoder may decrease the luminance level in the first field and increase the luminance level in the corresponding second field to encode a one bit. By adjusting the level in opposite directions in consecutive fields, the human persistence of vision causes any minor noticeable changes to be cancelled out so as to be imperceptible.

Each bit of the serial number is encoded into a frame in the above-described manner. To provide noise immunity, the bit may be redundantly encoded over the entire trace of each field or localized to one or more selected lines. The entire serial number, including the error check sequence, is preferably encoded into consecutive frames. Further, the serial number is preferably repeatedly encoded throughout the full length of the program event so that an editing removal of a portion of the event will not erase the serial number.

The displayed video may be recorded with a video cassette recorder (VCR). Some unscrupulous subscribers may distribute the cassette widely and/or make multiple copies of the video tape. By employing the decoder present invention, law enforcement authorities may extract from a cassette the serial number identifying the originating subscriber.

Figure 7:
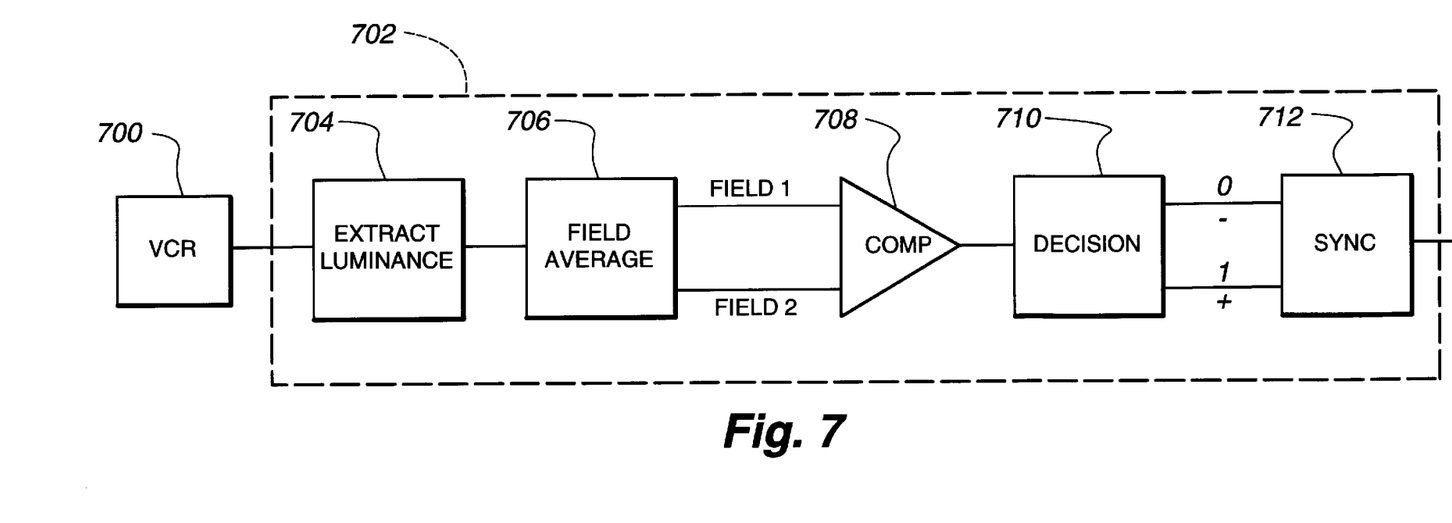
FIG. 7 illustrates a decoder according to the present invention.
Figure 8:
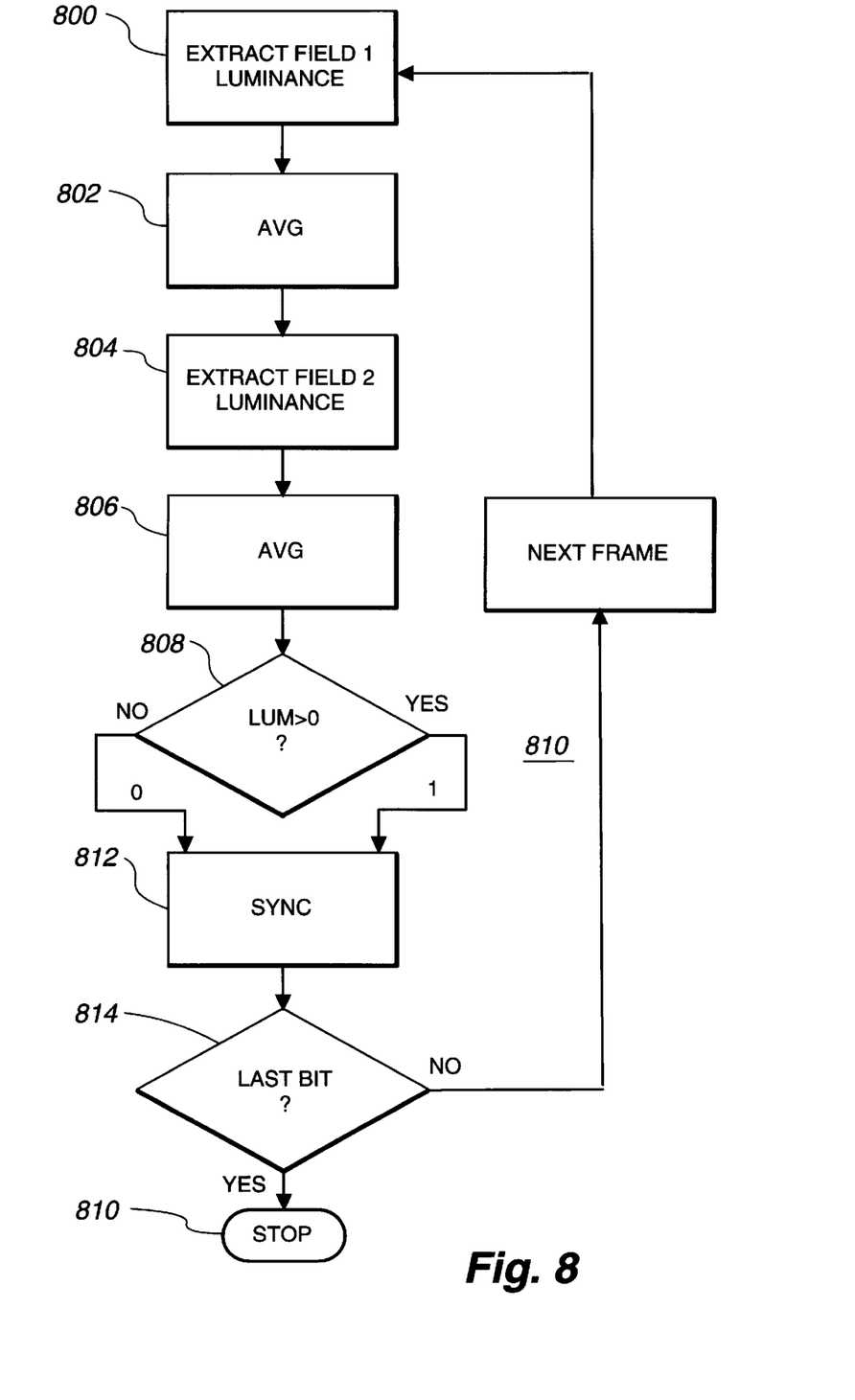
FIG. 8 is a flow chart diagramming serial number decoding according to the present invention.

FIG. 7 illustrates a video cassette recorder 700 coupled to a serial number decoder 702 of the present invention. FIG. 8 is a flow chart diagramming the operation of the decoder of FIG. 7. The decoder includes a filter 704 to extract the luminance component of the video signal, an averaging circuit 706 to average the luminance values within a field, a comparator 708, decision logic 710, and a synchronization circuit 712.

The serial number decoder 702 operates as follows. The luminance filter 704 extracts the luminance component of the video signal from the VCR, and outputs those portions of the image containing encoded bits (step 800). Those portions can comprise an entire field encoded with a single bit, or one or more selected lines within a field. Those skilled in the art will understand that other locations within an image can be encoded without loss of generality.

The averaging circuit 706 averages the luminance level for the selected locations over the entire field (step 802) using techniques well known in the art. The averaging circuit 706 retains this value for a later comparison. When the second field within a frame is output by the VCR 700, the luminance filter 704 extracts the luminance components for the relevant locations within the second field in the frame (step 804). The averaging circuit 706 then averages these values (step 806).

The comparator 708 compares the luminance levels of the successive fields (step 808). Based upon the comparator output, the decision logic 710 determines whether a zero bit or a one bit was encoded (step 810). According to one embodiment, the decision logic 710 outputs a one bit if the average luminance of the second field is greater than that of the first field. If not, then the decision logic outputs a zero bit. As the bits output by the decision logic form a string of bits, the synchronization circuitry 712 searches for a valid string containing the serial number by employing the cyclic redundancy check code in a well-known manner (step 812). The decoder continues generating bits until it has locked onto a valid string. At that point, it will still continue to generate bits, until the last bit in the serial number (including error correction bits) has been generated (steps 814). Using the decoder, law enforcement authorities can extract from the video cassette the serial number identifying the originating subscriber.

While the invention has been described with reference to numerous specific details, one of ordinary skill in the art will recognize that the invention can be embodied in other specific forms without departing from the spirit of the invention. In particular, those skilled in the art will recognize that the invention is not limited to the embodiments described herein, but rather that a wide variety of well-known encryption and decryption techniques may be employed to implement the present invention. In particular, the invention is not limited to the encoding of the luminance component of an NTSC signal. Further, the present invention is not limited to interactive networks, but is also applicable to other media delivery systems. In general, the present invention is applicable to the embedding of an imperceptible, yet detectable and traceable, unique serial number in any type of program content, such as video and/or music compact disks, digital video disks, or any MPEG-formatted delivery system. Thus, one of ordinary skill in the art will understand that the invention is not to be limited by the foregoing illustrative details, but rather is to be defined by the appended claims.

What is claimed is:

1. A communications system for delivering a program event from a source to a user in response to said source receiving a user request for a program event, comprising:

serial number generating means located at said source for generating a serial number unique to said user in response to receiving said user request for said program event;

a set-top terminal located at said user for receiving said program event and said serial number from said source;

receiving means located at said set-top terminal for responding to said serial number unique to said user; and embedding means located at said set-top terminal responsive to said receiving means for embedding said serial number into said program event, wherein said serial number is imperceptible to said user when said program event is played to said user.

2. The communication system of claim 1 wherein said serial number is a binary number that includes a cyclic redundancy check code, and wherein said embedding means operates to differentially encode each bit of said serial number into alternating fields of said program event.

3. This communication system of claim 1 wherein said serial number is a binary number that includes a cyclic redundancy check code, and wherein said embedding means operates to encode each bit of said serial number by adjusting a luminance field of at least one field of said program event.

4. In a communications system for delivering a program event from a head end to a user having a set-top terminal in response to said head end receiving a request from said user for a program event, a method for encoding a serial number into said program event, comprising the steps of:

providing serial number generating means at said head end for generating a serial number that is unique to said user in response to receiving said request for said program event;

providing receiving means at said set-top terminal for responding to said serial number unique to said user; and providing embedding means at said set-top terminal responsive to said receiving means for embedding said serial number into said program event, wherein said serial-number is imperceptible to said user when said program event is played to said user.

5. The method of claim 4 wherein:

said program event comprises a plurality of video images, each video image having two fields;

said serial number comprises a plurality of bits; and said step of providing said embedding means includes the step of embedding each bit of said serial number into at least one field of said program event.

6. The method of claim 4 wherein:

said program event comprises a plurality of video images, each video image having two fields;

said serial number comprises a plurality of bits; and said step of providing said embedding means includes the step of differentially encoding each bit of said serial number into alternating fields of said program event.

7. The method of claim 4 wherein:

said program event comprises a plurality of video images, each video image having two fields;

said serial number comprises a plurality of bits; and said step of providing said embedding means includes the step of embedding each bit of said serial number by adjusting a luminance level of at least one field of said program event.

8. The method of claim 4 wherein said program-event comprises a plurality of video images, each video image having two fields; and wherein said step of providing said embedding means includes the step of differentially encoding said serial number into alternating fields of said program event by adjusting a luminance level of said alternating fields; said method including the steps of:

providing comparing means at said set-top terminal for comparing an average luminance level of said alternating fields; and providing determining means at said set-top terminal responsive to said comparing means for determining a value of said serial number.

9. In a communication system for delivering a program event that comprises a plurality of video images to a user, each video image of said program event having two fields, said program event containing a serial number that is unique to said user, said serial number being encoded into said program event so as to be imperceptible to said user when said program event is played to said user, said serial number being encoded into said program event by differentially encoding said serial number into alternating fields of said program event; a method for recovering said serial number from said program event comprising the steps of:

receiving said program event at said user;

providing decoding means at said user that is responsive to said program event, said decoding means operating to compare an average luminance value of said encoded alternating fields of said program event; and providing determining means at said user that is responsive to said decoding means for determining said serial number based upon said comparison.

10. A communication system having a head end that stores a plurality of program events and a plurality of users that are connected to said head end, said head-end operating in response to said head end receiving a user request from a given user for a given program event to transmit said given-program event to said given user, said communication system including:

generating means at said head end for generating a serial number that is unique to said given user in response to said head end receiving said user-request from said given user;

transmitting means at said head end for transmitting said given-program event and said unique serial number;

receiving means at said given user for receiving said given program event and said unique serial number from said transmitting means; and embedding means at said given user responsive to said receiving means for embedding said unique serial number into said given program event such that said unique serial number is imperceptible to said given user when said given-program event is utilized by said given user.

11. The communication system of claim 10 wherein said generating means generates said unique serial number so as to include one or more unique indicia selected from the group time stamp, date stamp, and cyclic redundancy check code.

12. The communication system of claim 10 wherein each of said plurality of program events comprise a plurality fields, and wherein said embedding means operates to embed said unique serial number into said given-program event by adjusting a luminance level of at least one field of a said given program event.

13. The communication system of claim 10 wherein each of said plurality of program events comprise a plurality of video images, each video image having two fields, and wherein said embedding means operates to encode said unique serial number into said two fields of said given-program event by differentially adjusting a luminance level of alternating ones of said two fields.

14. The communication system of claim 13 including:

comparing means at said given user responsive to an luminance level of said alternating ones of said two fields, and determining means at said given user responsive to said comparing means for determining a value of said unique serial number.

15. The communication system of claim 14, including:

a plurality of set-top terminals, at least one set-top terminal at each of said plurality of users, and each of said set-top terminals having a said receiving means, a said embedding means, a said comparing means, and a said determining means.

* * * * *